(12) United States Patent  
Kim

(10) Patent No.: US 10,254,753 B2  
(45) Date of Patent: Apr. 9, 2019

(54) SYSTEM FOR PREDICTING ABNORMALITY OCCURRENCE USING PLC LOG DATA

(71) Applicant: LSIS CO., LTD., Anyang-si, Gyeonggi-do (KR)

(72) Inventor: Seung Jong Kim, Chungcheongbukdo (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 341 days.

(21) Appl. No.: 14/809,097

(22) Filed: Jul. 24, 2015

(65) Prior Publication Data

US 2016/0077510 A1    Mar. 17, 2016

(30) Foreign Application Priority Data

Sep. 17, 2014   (KR) ........................ 10-2014-0123485

(51) Int. Cl.  
*G05B 23/02*      (2006.01)

(52) U.S. Cl.  
CPC ................ *G05B 23/0227* (2013.01)

(58) Field of Classification Search  
CPC .................................................. G05B 23/0227  
See application file for complete search history.

(56) References Cited

U.S. PATENT DOCUMENTS 7,526,405 B2 * 4/2009 Miller .................. G05B 23/024  
                                                              382/144  
8,027,946 B1 * 9/2011 Daily .................. G06F 11/2257  
                                                              706/47

2003/0200060 A1   10/2003   Eryurek et al.  
(Continued)

FOREIGN PATENT DOCUMENTS

CN         101167026       4/2008  
CN         103443727      12/2013  
(Continued)

OTHER PUBLICATIONS

Korean Intellectual Property Office Application Serial No. 10-2014-0123485, Office Action dated Sep. 30, 2015, 3 pages.  
Japan Patent Office Application No. 2015-154999, Office Action dated Aug. 9, 2016, 2 pages.  
Venkatasubramanian, et al., "A Review of Process Fault Detection and Diagnosis Part III: Process History Based Methods," Elsevier, Computers & Chemical Engineering, XP55126846, Mar. 2003, 20 pages.

(Continued)

*Primary Examiner* — Kenneth M Lo  
*Assistant Examiner* — Mohammad A Rahman  
(74) *Attorney, Agent, or Firm* — K&L Gates LLP

(57) ABSTRACT

The present disclosure relates to a system for predicting abnormality occurrence using a PLC log data, the system including a controller configured to receive a data from a lower-level device connected to a PLC data log module and determine the data, and to store the data in an event storage when the data is a data related to abnormality occurrence, an analyzer configured to generate an abnormality analysis result by analyzing the data related to abnormality occurrence, and an analysis result storage configured to store the abnormality analysis result, wherein the controller compares the data transmitted from the lower-level device with the abnormality analysis result stored in the analysis result storage, and generates an abnormality occurrence prediction signal, when it is determined that the data transmitted from the lower-level device is similar to the abnormality analysis result.

3 Claims, 3 Drawing Sheets

(56) References Cited

U.S. PATENT DOCUMENTS

| | | | |
|---|---|---|---|
| 2004/0002776 A1* | 1/2004 | Bickford | G05B 23/0254 700/30 |
| 2005/0033527 A1* | 2/2005 | Wada | G01D 3/08 702/35 |
| 2005/0066241 A1* | 3/2005 | Gross | G05B 23/0283 714/48 |
| 2005/0066247 A1 | 3/2005 | Cheng et al. | |
| 2005/0210337 A1* | 9/2005 | Chester | G05B 23/0262 714/47.2 |
| 2006/0195201 A1* | 8/2006 | Nauck | G05B 17/02 700/30 |
| 2013/0051239 A1* | 2/2013 | Meredith | H04W 16/18 370/241 |
| 2013/0069792 A1* | 3/2013 | Blevins | G05B 17/02 340/815.4 |
| 2015/0005936 A1* | 1/2015 | Ito | B25J 9/163 700/250 |
| 2015/0220847 A1* | 8/2015 | Shibuya | G06N 5/047 706/12 |

FOREIGN PATENT DOCUMENTS

| | | |
|---|---|---|
| EP | 1873604 | 1/2008 |
| JP | 08-320721 | 12/1996 |
| JP | 4557007 | 10/2010 |
| KR | 10-1387968 | 4/2014 |
| KR | 10-2014-0068698 | 6/2014 |

OTHER PUBLICATIONS

European Patent Office Application Serial No. 15178486.5, Search Report dated Feb. 8, 2016, 10 pages.

State Intellectual Property Office of the People's Republic of China Application Serial No. 201510591909.3, Office Action dated Aug. 1, 2017, 6 pages.

European Oral Proceedings for related European Application No. 15178486.5; action dated May 7, 2018; (10 pages).

* cited by examiner

SYSTEM FOR PREDICTING ABNORMALITY OCCURRENCE USING PLC LOG DATA

Pursuant to 35 U.S.C. § 119(a), this application claims the benefit of earlier filing date and right of priority to Korean Patent Application No(s). 10-2014-0123485, filed on Sep. 17, 2014, the contents of which are all hereby incorporated by reference herein in its entirety.

BACKGROUND OF THE DISCLOSURE

Field of Endeavor

The present disclosure relates to a system for predicting abnormality occurrence, and more particularly, to a system for predicting abnormality occurrence using a PLC (Programmable Logic Controller) log data configured to analyze a data of abnormity occurrence among data collected from a PLC data log module and to predict generation of abnormality sign (indication) when a data of similar condition occurs.

Background

Although a factory system was conventionally operated by independent manipulation of machines and/or devices in automation facilities at a traditional industrial site, changes in the system are being required these days as modern industries become more complicated and diversified. That is, a device is required to complement the complicated and diversified operation, and therefore, a PLC (Programmable Logic Controller) system for directly controlling sites has been developed.

The PLC is largely controlled unmannedly, and when an abnormal operation is discovered, the abnormal operation can be ascertained by allowing the PLC to monitor a series of operations or to store a log data such as past history in order to take a post-facto arrangement. A conventional PLC data log module stores a relevant device value along with time when a condition set up by a user is satisfied. However, in case data is stored for a long time, the conventional PLC data log module disadvantageously consumes lots of time for analyzing a data amount when the data amount grows larger. Furthermore, the data stored in the data log module performs no function at all before information inside a memory card stored with the data is checked and analyzed by a user.

That is, the conventional PLC data log module functions to store relevant device value when a condition set up by a user is satisfied, and fails to provide data trends, variations and values related to correlation by analyzing the stored data. Hence, the conventional PLC data log module lacks the function of providing generation of abnormality sign (indication) to a user when there is generated the abnormality sign (indication).

SUMMARY

The present disclosure has been made to solve the foregoing disadvantages/problems of the prior art and therefore an object of certain embodiments of the present invention is to provide a system for predicting abnormality occurrence using a PLC (Programmable Logic Controller) log data configured to analyze a data of abnormity occurrence among data collected from a PLC data log module and to predict generation of abnormality sign (indication) when a data of similar condition occurs.

In one general aspect of the present disclosure, there is provided a system for predicting abnormality occurrence using a PLC log data, the system comprising:

a controller configured to receive a data from a lower-level device connected to a PLC data log module and determine the data, and to store the data in an event storage when the data is a data related to abnormality occurrence;

an analyzer configured to generate an abnormality analysis result by analyzing the data related to abnormality occurrence; and an analysis result storage configured to store the abnormality analysis result, wherein the controller compares the data transmitted from the lower-level device with the abnormality analysis result stored in the analysis result storage, and generates an abnormality occurrence prediction signal, when it is determined that the data transmitted from the lower-level device is similar to the abnormality analysis result.

Preferably, but not necessarily, the event storage may store the data related to abnormality occurrence along with time data.

Preferably, but not necessarily, the system may further comprise an alarm unit configured to alarm that abnormality occurrence is predicted by receiving the abnormality occurrence prediction signal from the controller.

Preferably, but not necessarily, the controller may transmit the data related to the abnormality occurrence along with the time data.

Preferably, but not necessarily, the analyzer may generate the result of abnormality analysis by analyzing a pattern in response to a time change of the data related to the abnormality occurrence.

Preferably, but not necessarily, the analyzer may calculate an average of analyzed data and an inclination, and stores the calculation in the analysis result storage when the change trend has a linearity within a predetermined scope of pattern as a result of analysis of the pattern.

Preferably, but not necessarily, the analyzer may store a converged data value in the analysis result storage when the pattern has a converging physical property as a result of analysis of the pattern.

Preferably, but not necessarily, the analyzer may calculate a time of a data being constantly maintained when the pattern has a circulating physical property as a result of pattern analysis and stores the time in the analysis result storage.

Advantageous Effects

The system for predicting abnormality occurrence using a PLC log data according to the present disclosure has an advantageous effect in that a data of abnormity occurrence is analyzed among data collected from a PLC data log module and generation of abnormality sign (indication) is predicted to provide a user a quick measure when a data of similar condition occurs after grasping trends, variations and association rules.

DETAILED DESCRIPTION

Hereinafter, exemplary embodiments of the present disclosure will be described in detail with reference to the accompanying drawings.

Features and advantages of the exemplary embodiments will be or will become apparent to one of ordinary skill in the art upon examination of the following figures and detailed description. In describing the present disclosure, certain layers, sizes, shapes, components or features may be exaggerated for clarity and convenience. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 1:
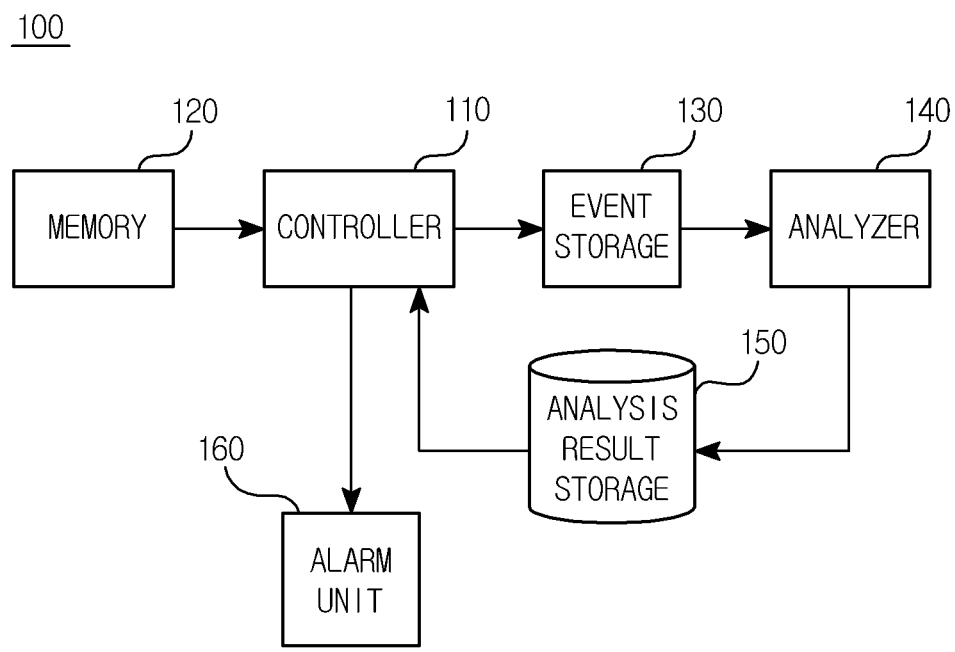
FIG. 1 is a block diagram illustrating a system for predicting abnormality occurrence using a PLC log data according to an exemplary embodiment of the present disclosure.

FIG. 1 is a block diagram illustrating a system for predicting abnormality occurrence using a PLC log data according to an exemplary embodiment of the present disclosure.

Referring to FIG. 1, a system for predicting abnormality occurrence using a PLC log data according to an exemplary embodiment of the present disclosure (100, hereinafter referred to as "abnormality occurrence prediction system") may include a controller (110), a memory (120), an event storage (130), an analyzer (140), an analysis result storage (150) and an alarm unit (160).

At this time, the abnormality occurrence prediction system (100) may be formed on a PLC data log module, and a part of the abnormality occurrence prediction system (100) may be formed on the PLC data log module, while the other part of abnormality occurrence prediction system (100) may be separately formed away from the abnormality occurrence prediction system (100).

The controller (110) may receive a data transmitted from a lower-level device, e.g., a PLC basic module, connected to the PLC data log module and store the data in the memory (120). At this time, the PLC basic module may be a CPU (Central Processing Unit) module, where the CPU module may recognize a parameter established at the PLC data log module and transmit a data related to the relevant device stored in the CPU module to the controller (110). At this time, the controller (110) may determine the received data, and when it is determined that the received data is a data related to abnormality occurrence, the controller (110) may store the data relevant to the g abnormality occurrence in the event storage (130).

Furthermore, the controller (130) may compare the received data with an abnormality analysis result with an abnormality analysis result stored in the analysis result storage (150), and may generate an abnormality occurrence prediction signal, when it is determined that the received data is similar to the abnormality analysis result.

That is, as will be described later, the abnormality analysis result is generated by analyzing, by the analyzer (140), the data related to abnormality occurrence, such that when a data similar to the abnormality analysis result is received, the received data has a high probability of being a data related to abnormality occurrence.

Referring to FIG. 2, the abnormality analysis result may be generated by analyzing a data based on time. The event storage (130) may store the data related to the abnormality occurrence transmitted from the controller (110), and may preferably store the data by dividing data for each abnormality occurrence. Furthermore, the event storage (130) may store the data related to the abnormality occurrence along with the time data. At this time, the time data may be transmitted from the controller (110) along with the data related to the abnormality occurrence, and the event storage (130) may simultaneously store the data related to the abnormality occurrence and the time data.

The analyzer (140) may generate an abnormality analysis result by analyzing the data related to abnormality occurrence stored in the event storage (130), and the abnormality analysis result generated by the analyzer (140) may be stored in the analysis result storage (150). Meantime, the analyzer (140) may generate the abnormality analysis result by analyzing the data based on time change.

The alarm unit (160) may be a means configured to alarm that abnormality occurrence is predicted by receiving the abnormality occurrence prediction signal from the controller (110), and may be variably formed by a display device such as a monitor and an alarm device configured to generate an alarm, for example.

Figure 2A:
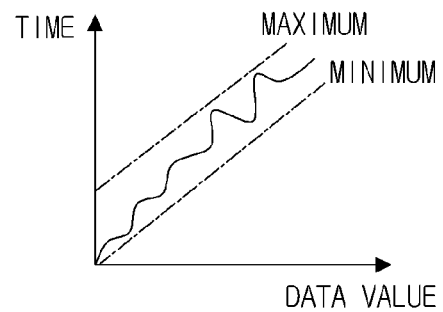
FIGS. 2a to 2c illustrate graphs exemplifying patterns analyzed by an analyzer of a system for predicting abnormality occurrence using a PLC log data according to an exemplary embodiment of the present disclosure.
Figure 2B:
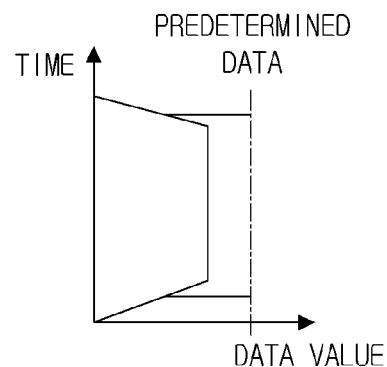
Figure 2C:
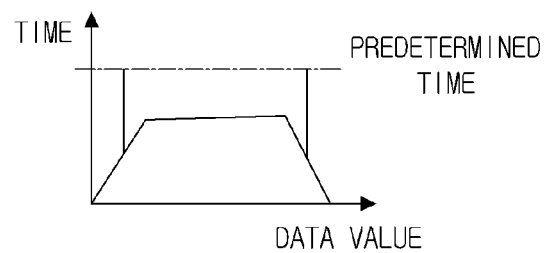

FIGS. 2a to 2c illustrate graphs exemplifying patterns analyzed by an analyzer of a system for predicting abnormality occurrence using a PLC log data according to an exemplary embodiment of the present disclosure, where FIG. 2a illustrates a case of a graph where data change has a constant flow with no great change, FIG. 2b illustrates a case of a graph where data change is converged to a predetermined data value at a particular point, albeit the data change based on time being irregular, and FIG. 2c illustrates a case of a graph where the data is repeated at every predetermined time.

Thus, the analyzer (140) may analyze the data related to the abnormality occurrence store in the event storage (130) and may generate the abnormality analysis result by analyzing the data in response to time as illustrated in FIGS. 2a to 2c.

At this time, the analyzer (140) may analyze a pattern of the data based on the time change, and calculate an average of analyzed data and an inclination when change trend has a linearity within a predetermined scope, and store the calculation in the analysis result storage (150) when the change trend has the linearity within a predetermined scope of pattern as a result of analysis of the pattern as illustrated in FIG. 2a.

Furthermore, the analyzer may store a converged data value along with the abnormality analysis result in the analysis result storage (150) when the pattern of the data based on the time change has a converging physical property as a result of analysis of the pattern as illustrated in FIG. 2b.

Furthermore, the analyzer (140) may calculate a time of a data being constantly maintained when the pattern has a circulating physical property as a result of pattern analysis as illustrated in FIG. 2c, and store the time along with the abnormality analysis result in the analysis result storage (150).

As described in the foregoing, the controller (110) may compare the received data with the abnormality analysis result generated by the analyzer (140) and generate an abnormality occurrence prediction signal, and transmit the abnormality occurrence prediction signal to the alarm unit (160), when it is determined that the received data is similar to the abnormality analysis result.

Furthermore, the controller (110) may transmit the physical property of the data determined as being similar to the abnormality analysis result to the alarm unit (160) along with the abnormality occurrence prediction signal, where the alarm unit (160) may alarm that abnormality occurrence is predicted and also alarm the presence of the physical property of the data.

The physical property of the data determined as being similar to the abnormality analysis result may include an average of analyzed data stored in the analysis result storage (150) along with the abnormality analysis result, an inclination, a data value converged by the analysis data and a time where the analysis data is constantly maintained.

Figure 3:
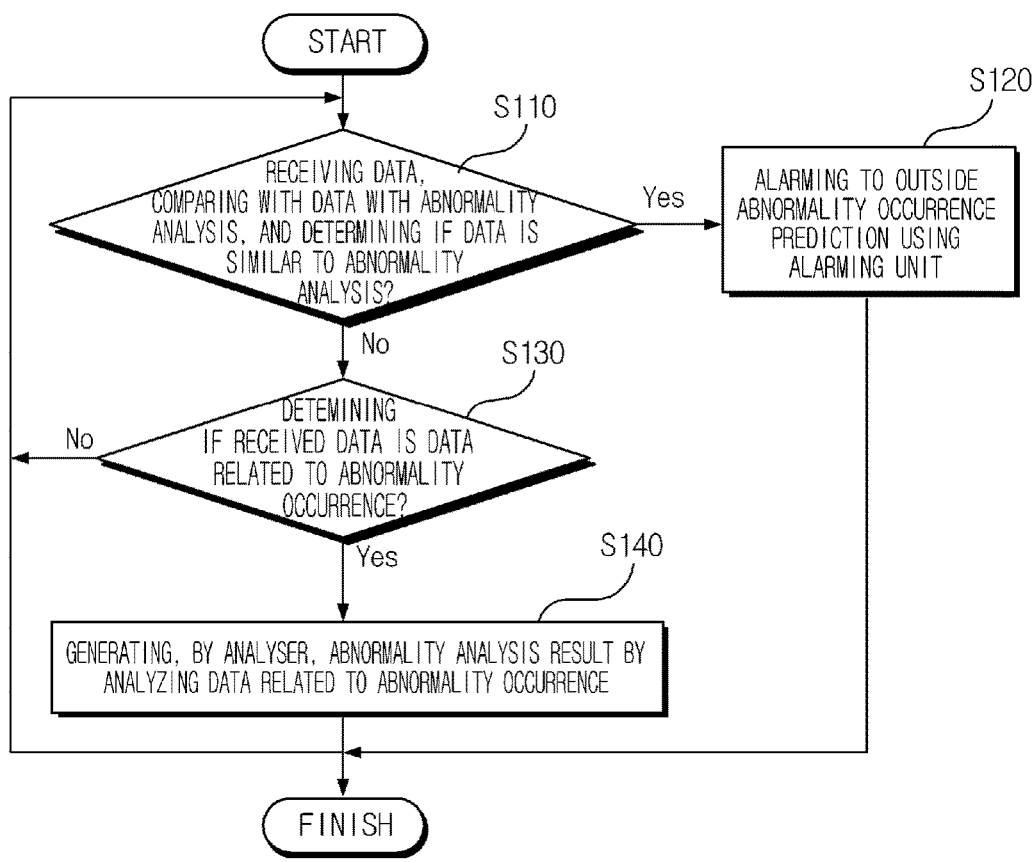
FIG. 3 is a flowchart illustrating a method for predicting abnormality occurrence using a PLC log data according to an exemplary embodiment of the present disclosure.

FIG. 3 is a flowchart illustrating a method for predicting abnormality occurrence using a PLC log data according to an exemplary embodiment of the present disclosure.

Referring to FIG. 3, the method for predicting abnormality occurrence may include receiving, by the controller (110), a data from a lower-level device, comparing the data with the abnormality analysis result and determining whether the received data is similar to the abnormality analysis result (S110).

At this time, the controller (110) may compare the data received from the lower-level by receiving the abnormality analysis result stored in the analysis result storage (150). The method may further comprise alarming to outside that abnormality occurrence is predicted using the alarming unit (S120), when it is determined at S110 that the received data is similar to the abnormality analysis result (S110—yes).

At this time, when it is determined at S110 that the received data is similar to the abnormality analysis result (S110—yes), the controller (110) may transmit the abnormality occurrence prediction signal to the alarm unit (160), where the alarm unit (160) may receive the abnormality occurrence prediction signal to alarm that the abnormality occurrence is predicted. Furthermore, the controller (110) may transmit to the alarm unit (160) the physical property of the data determined as being similar to the abnormality analysis result along with the abnormality occurrence prediction signal.

When it is determined at S110 that the received data is dissimilar to the abnormality analysis result (S130—no), the controller (110) may determine whether the received data is a data related to the abnormality occurrence (S130). At this time, when it is determined at S110 that the received data is dissimilar to the abnormality analysis result (S130—no), flow may proceed to the step (S110) determining whether the received data is dissimilar to the abnormality analysis result and compare a newly received data with the abnormality analysis result.

When it is determined that the received data is a data related to the abnormality occurrence (S130—yes), the analyzer (140) may analyze the data related to the abnormality occurrence to generate an abnormality analysis result (S140).

Meanwhile, when it is determined that the received data is a data related to the abnormality occurrence (S130—yes), the controller may transmit the data related to the abnormality occurrence to the event storage (130) and store the data in the event storage (130), and the analyzer (140) may analyze the data related to the abnormality occurrence stored in the even storage (130) to generate an abnormality analysis result (S140). The analyzer (140) may analyze the pattern of data based on time change and store an analysis result in the analysis result storage (150).

At this time, when it is determined that the change trend has linearity within a predetermined scope of pattern as a result of analysis of the pattern of the data based on the time change, the analyzer (140) may calculate an average and inclination of analyzed data to store the calculation along with the abnormality analysis result in the analysis result storage (150). Furthermore, the analyzer (140) may store a converged data value along with the abnormality analysis result in the analysis result storage (150) when it is determined that the pattern of data based on time change has a converging physical property as a result of analysis of the pattern.

Furthermore, when it is determined that the pattern of data has a circulating physical property as a result of pattern analysis based on time change, the analyzer (140) may calculate a time of a data being constantly maintained and store the time along with the abnormality analysis result in the analysis result storage (150).

Meantime, the controller (110) may transmit the time data along with the data related to the abnormality occurrence to the event storage (130).

Although the present disclosure has been described with reference to the system and method for predicting abnormality occurrence using a PLC (Programmable Logic Controller) log data, it should be understood that numerous other modifications and embodiments can be devised by those skilled in the art that will fall within the spirit and scope of the principles of this disclosure.

Although the present disclosure has been described in detail with reference to the foregoing embodiments and advantages, many alternatives, modifications, and variations will be apparent to those skilled in the art within the metes and bounds of the claims. Therefore, it should be understood that the above-described embodiments are not limited by any of the details of the foregoing description, unless otherwise specified, but rather should be construed broadly within the scope as defined in the appended claims.

What is claimed is:

1. A system for predicting abnormality occurrence using Programmable Logic Controller (PLC) log data, the system comprising:
   a controller configured to receive the PLC log data from a lower-level device connected to a PLC data log module to determine the PLC log data, and to store the determined data when the determined data is related to abnormality occurrence;
   an analyzer configured to generate and store an abnormality analysis result by analyzing the determined data related to the abnormality occurrence; and
   an alarm unit configured to receive an abnormality occurrence prediction signal from the controller and generate an alarm for a user indicating that the abnormality occurrence is predicted,
   wherein the controller is further configured to:
      compare the PLC log data received from the lower-level device with the stored abnormality analysis result;
      generate the abnormality occurrence prediction signal when it is determined that the PLC log data received from the lower-level device is similar to the stored abnormality analysis result; and
      determine whether the received PLC log data is related to the abnormality occurrence,
   wherein the analyzer is further configured to:
      generate the abnormality analysis result by analyzing a pattern of the determined data based on a time change;
      calculate an average of the analyzed data and an inclination, and store the calculated average and inclination along with the abnormality analysis result when a change trend has linearity within a predetermined scope of the analyzed pattern as a result of the analysis of the pattern of the determined data based on the time change;

store a predetermined data value along with the abnormality analysis result when it is determined that the analyzed pattern has a converging physical property where a data change is converged to the predetermined data value as the result of the analysis of the pattern of the determined data based on the time change; and calculate a time for which the analyzed data is constantly maintained and store the calculated time along with the abnormality analysis result when the analyzed pattern has a circulating physical property as the result of the analysis of the pattern of the determined data based on the time change, wherein at least one of the average of the analyzed data, the inclination, the predetermined data value, and the time is sent to the alarm unit along with the abnormality occurrence prediction signal to alert the user.

2. The system of claim 1, wherein the controller is further configured to store the determined data related to the abnormality occurrence with time data.

3. The system of claim 2, wherein the controller is further configured to transmit the determined data related to the abnormality occurrence with the time data.

* * * * *